United States Patent [19]

Stevenson

[11] Patent Number: 5,267,746
[45] Date of Patent: Dec. 7, 1993

[54] SNOWMOBILE AND JET SKI TRAILER APPARATUS

[76] Inventor: Larry B. Stevenson, 221 Shady Oaks Dr., Burleson, Tex. 76028

[21] Appl. No.: 899,892

[22] Filed: Jun. 17, 1992

[51] Int. Cl.⁵ ............................................. B60P 3/10
[52] U.S. Cl. ..................... 280/414.2; 280/47.331; 114/344
[58] Field of Search ............ 280/414.2, 414.5, 24, 280/7.1, 11, 47.331; 114/344

[56] References Cited

U.S. PATENT DOCUMENTS

| | | | |
|---|---|---|---|
| 2,515,379 | 7/1950 | Paine | 280/414.5 |
| 2,774,606 | 12/1956 | Burweger et al. | 280/414.5 |
| 2,780,475 | 2/1957 | Koerner | 280/414.5 |
| 3,537,117 | 11/1970 | Plesnevich | 114/344 |
| 4,754,988 | 7/1988 | Hofgren | 114/344 X |
| 4,856,799 | 8/1989 | Hawn | 280/24 |
| 5,005,846 | 4/1991 | Taylor | 280/414.2 X |
| 5,042,417 | 8/1991 | Raymond | 114/344 X |
| 5,119,752 | 6/1992 | Doherty | 280/24 X |

FOREIGN PATENT DOCUMENTS 2614004 10/1988 France .................. 280/414.2

Primary Examiner—David M. Mitchell
Assistant Examiner—Gary C. Hoge
Attorney, Agent, or Firm—Leon Gilden

[57] ABSTRACT

A container trailer removably mounting a container thereon includes a generally U-shaped framework having a draw bar fixedly mounted to a junction of spaced legs of the framework to receive the associated container. The spaced legs each include retractable wheels pivotally mounted at distal ends of each of the legs to permit support of the container trailer upon a fixed support surface, or alternatively retraction of the wheels permitting flotation of the apparatus upon a body of water.

4 Claims, 4 Drawing Sheets

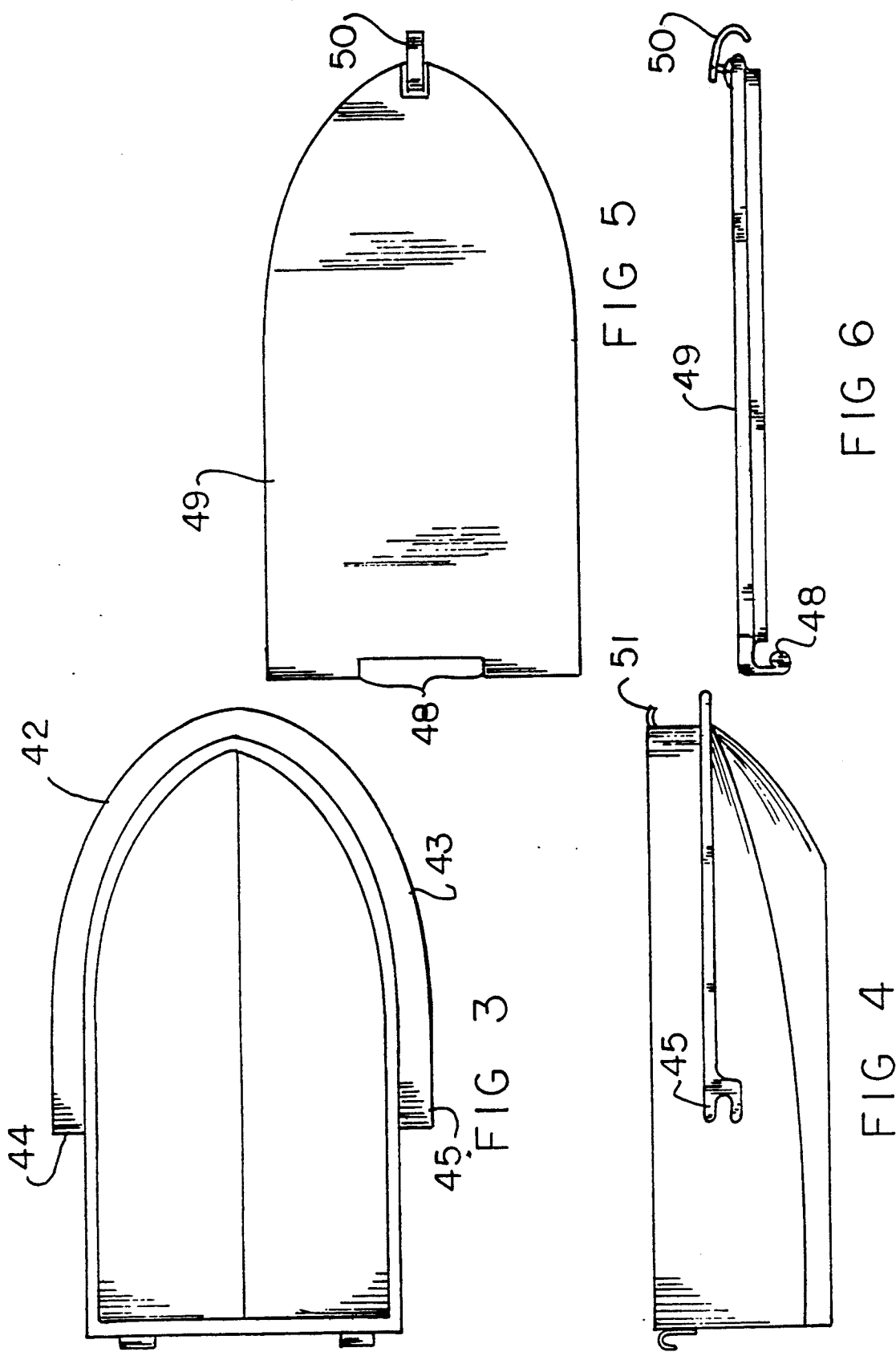

SNOWMOBILE AND JET SKI TRAILER APPARATUS

BACKGROUND OF THE INVENTION

1. Field of the Invention

The field of invention relates to trailer apparatus, and more particularly pertains to a new and improved snowmobile and jet ski trailer apparatus wherein the same is arranged for ease of transport by a snowmobile and/or jet ski structure.

2. Description of the Prior Art

While trailer structure per se to transport various snowmobiles and water craft are availed in the prior art as exemplified in the U.S. Pat. Nos. 4,756,455; 3,885,690; 4,051,967; 4,014,444; and 4,603,872, such structure has heretofore failed to accommodate the snowmobile and jet ski structure per se formed with a readily transported trailer structure. The instant invention attempts to overcome such deficiencies of the prior art by providing for a trailer structure and associated container trailer to accommodate alternatively jet skis or snowmobiles, wherein such craft permit the container trailer member to be floatatingly transported about a body of water or a snow pack and in this respect, the present invention substantially fulfills this need.

SUMMARY OF THE INVENTION

In view of the foregoing disadvantages inherent in the known types of trailer apparatus now present in the prior art, the present invention provides a snowmobile and jet ski trailer apparatus wherein the same is arranged for the ease of transport relative to a snowmobile or jet ski assembly. As such, the general purpose of the present invention, which will be described subsequently in greater detail, is to provide a new and improved snowmobile and jet ski trailer apparatus which has all the advantages of the prior art trailer apparatus and none of the disadvantages.

To attain this, the present invention provides a container trailer removably mounting a container thereon, including a generally U-shaped framework having a draw bar fixedly mounted to a junction of spaced legs of the framework to receive the associated container. The spaced legs each include retractable wheels pivotally mounted at distal ends of each of the legs to permit support of the container trailer upon a fixed support surface, or alternatively retraction of the wheels permitting flotation of the apparatus upon a body of water.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved snowmobile and jet ski trailer apparatus which has all the advantages of the prior art trailer apparatus and none of the disadvantages.

It is another object of the present invention to provide a new and improved snowmobile and jet ski trailer apparatus which may be easily and efficiently manufactured and marketed.

It is a further object of the present invention to provide a new and improved snowmobile and jet ski trailer apparatus which is of a durable and reliable construction.

An even further object of the present invention is to provide a new and improved snowmobile and jet ski trailer apparatus which is susceptible of a low cost of manufacture with regard to both materials and labor, and which accordingly is then susceptible of low prices of sale to the consuming public, thereby making such snowmobile and jet ski trailer apparatus economically available to the buying public.

Still yet another object of the present invention is to provide a new and improved snowmobile and jet ski trailer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of the container member.

FIG. 4 is an orthographic side view of the container member.

FIG. 5 is an orthographic top view of the lid structure for the container member.

FIG. 6 is an orthographic side view of the lid member of the container member.

DESCRIPTION OF THE PREFERRED EMBODIMENT

Figure 1:
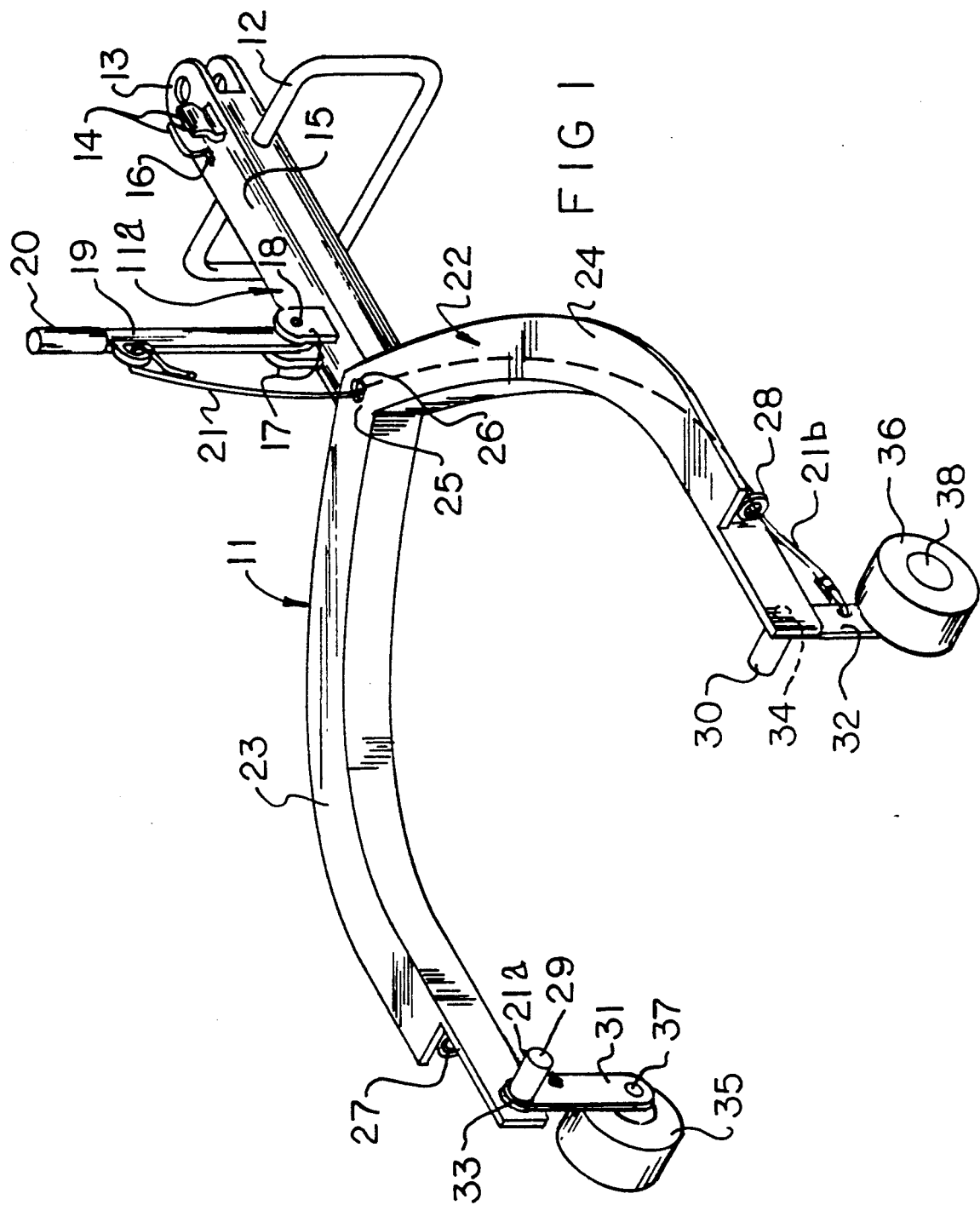
FIG. 1 is an isometric illustration of the container trailer structure of the invention.

With reference now to the drawings, and in particular to FIGS. 1 to 7 thereof, a new and improved snowmobile and jet ski trailer apparatus embodying the principles and concepts of the present invention and generally designated by the reference numeral 10 will be described.

More specifically, the snowmobile and jet ski trailer apparatus 10 of the instant invention essentially comprises a container trailer 11 having a draw bar 11a fixedly mounted to a plurality of the draw bar support legs defining the generally U-shaped framework. The draw bar 11a includes a support loop 12 fixedly mounted to spaced side walls of the draw bar, with the support loop 12 projecting downwardly below a bottom wall of the draw bar for support thereof when not coupled to an associated tow vehicle, such as a snowmobile or jet ski type structure (not shown). Spaced spring fingers 14 are mounted to a draw bar top wall 15 defining a cylindrical cavity 16 between the spring fingers 14, wherein the cylindrical cavity 16 has an axis parallel to the top wall 15 and orthogonally intersecting a pivot axle 18 orthogonally oriented between spaced parallel flange plates 17 mounted fixedly to the top wall 15. An actuator lever 19 has its lower end pivotally mounted about the pivot axle 18, with a lever handle 20 mounted to an upper end portion of the actuator handle 19. The handle 20 is generally spaced from the pivot axle 18 a predetermined spacing substantially equal to the spacing of the spring finger cylindrical cavity 16 relative to the pivot axle 18 to thereby receive and secure the actuator handle in a lowered orientation for latching thereof, in a manner as indicated in the FIG. 7.

The U-shaped framework or cradle 22 includes an actuator cable 21 directed through the cradle leg junction 25 of the cradle first and second legs 23 and 24. The actuator cable 21 is directed through a junction aperture 26, as illustrated in the FIG. 1 for example. Respective actuator cable first and second legs 21a and 21b are secured to the actuator cable 21 and extend along the first and second cradle legs 23 and 24, as illustrated, directed through respective first and second leg guide loops 27 and 28 positioned in spaced adjacency relative to first and second leg cylindrical bosses 29 and 30 orthogonally and fixedly mounted to the first and second legs. The first and second leg cylindrical bosses 29 and 30 are coaxially aligned relative to one another in a facing relationship having first and second leg plates 31 and 32 pivotally mounted to the respective first and second leg cylindrical bosses 29 and 30 at upper ends of the leg plates to respective first and second leg plate spring connections 33 and 34 to bias each leg plate in an orthogonal relationship relative to a respective cradle leg in a first position, as illustrated in the FIG. 1. The actuator cable first and second legs 21a and 21b are secured to the respective first and second leg plates 31 and 32 below the respective first and second leg cylindrical bosses 29 and 30. First and second wheels 35 and 36 rotatably mounted about respective first and second wheel axles 37 and 38 are rotatably mounted adjacent lower ends of the first and second leg plates 31 and 32 to permit manipulation of the container trailer 11 over a rigid support surface, as required. It should be further noted that the first and second wheel axles 37 and 38 maintained in a coaxially aligned relationship are parallel to and spaced relative to the first and second leg cylindrical bosses 29 and 30 respectively.

Figure 2:
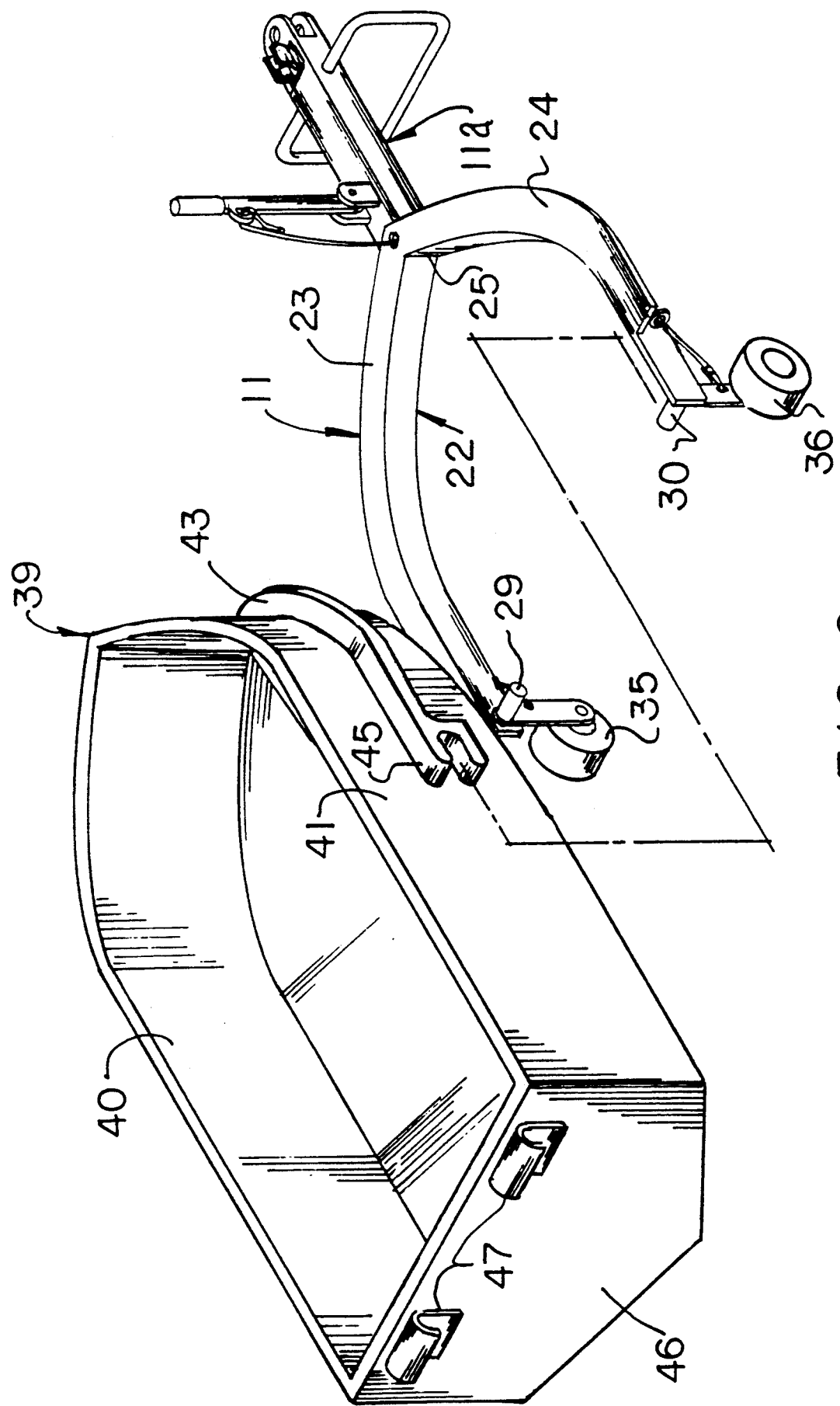
FIG. 2 is an isometric illustration of the container trailer and container member arranged for assembly relative to one another.
Figure 7:
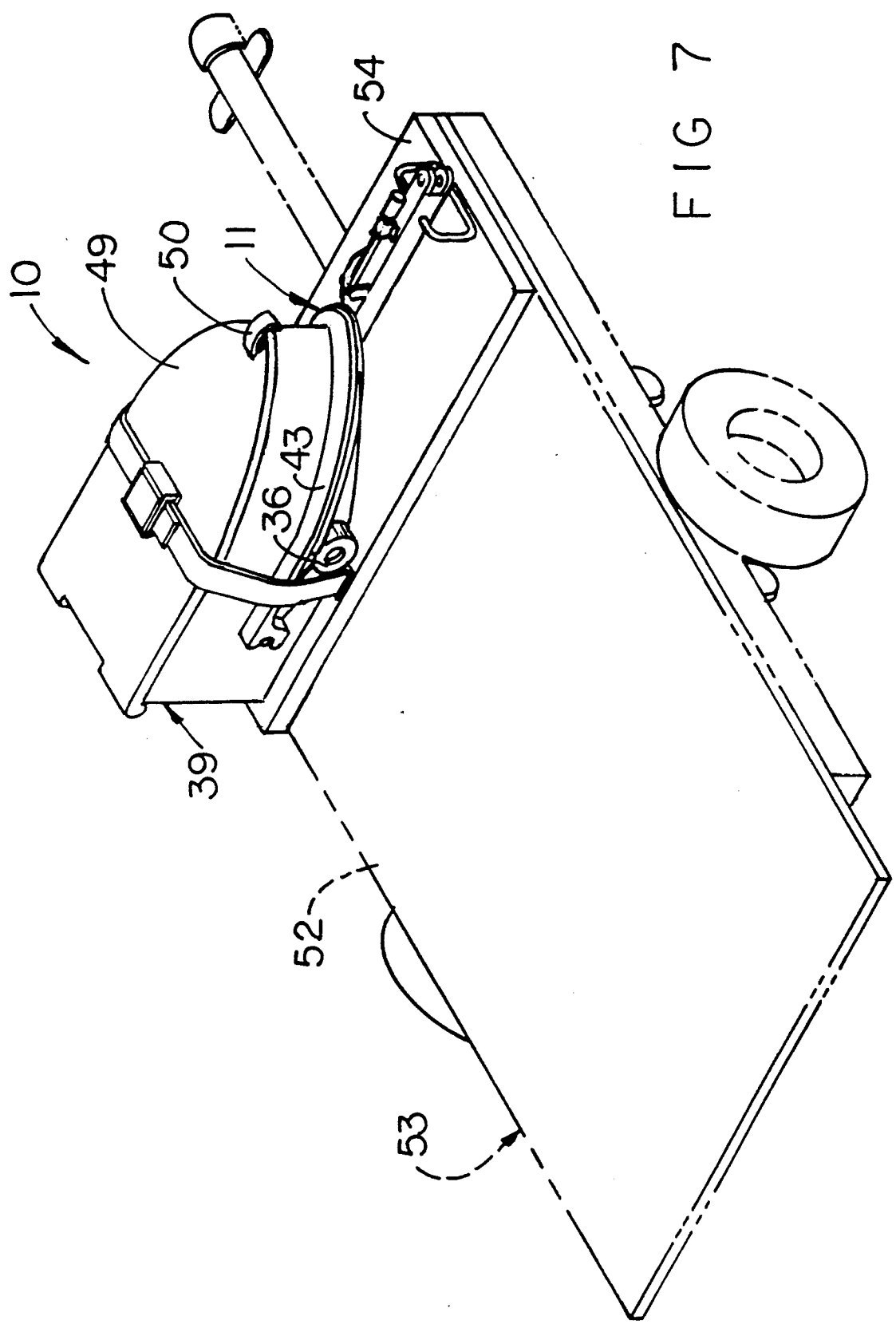
FIG. 7 is an isometric illustration of the invention mounted to a transport trailer.

A trailer container 39 is illustrated and exemplified in FIG. 2, to include first and second side walls 40 and 41 merging together at a side wall junction arranged for contiguous communication with the leg junction 25 of the U-shaped cradle 22. First and second side walls 40 and 41 are spaced apart a predetermined spacing substantially equal to the predetermined spacing and configuration of the first and second trailer legs 23 and 24 to permit complementary reception of the first and second side walls 40 and 41 between the first and second cradle legs 23 and 24, in a manner as indicated in FIG. 7 for example. First and second side wall flanges 42 and 43 orthogonally projecting exteriorly of the first and second side walls are arranged to be received upon the first and second cradle legs 23 and 24, with the first and second side wall flanges 42 and 43 terminating in first and second wall flange bifurcated ends 44 and 45 respectively receiving the first and second leg cylindrical bosses 29 and 30 to effect positioning of the container 39 onto the container trailer 11. The container includes a container rear wall 46 having a plurality of hinge flanges 47 arranged for receiving lid hinge flanges 48 of an associated lid 49. The lid 49 includes a forward latch 50 cooperative with a container forward latch 51 arranged at the junction of the container side walls.

As illustrated in FIG. 7, the organization is arranged for mounting to a trailer platform 52 of a trailer 53. The container trailer 11 and the trailer container 39 when in an assembled configuration are secured to a support plate 54 that includes a support plate strap directed through the support plate in surrounding relationship relative to the trailer container 39 and the container trailer 11.

In this manner, ease of transport of the organization is effected and wherein transport upon a rigid surface is available, the first and second wheels 35 and 36 are arranged in the first position orthogonally oriented relative to the U-shaped cradle 22. In the second position, with the actuator lever 19 secured within the cylindrical cavity 16 between the spring fingers 14, the wheels are retracted for permitting ease of flotation upon a body of water when drawn behind a water vehicle, such as a jet ski and the like. Further it should be noted that the draw bar 11a includes a bifurcated draw bar forward end coupling 13 to permit ease of securement of the container trailer to a tow vehicle.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A snowmobile and jet ski trailer apparatus, comprising,
    a container trailer, the container trailer having a draw bar, with the draw bar including spaced draw bar side walls, a draw bar top wall, and a draw bar bottom wall, and
    a U-shaped cradle having a first cradle leg and a second cradle leg coextensive relative to one another merging at a cradle leg junction, with the draw bar having a first end mounted to the draw bar junction, the draw bar having a second end, with the second end having a coupling for securement to a tow vehicle, and
    a container member arranged for complementary securement to the U-shaped cradle between the first cradle leg and the second cradle leg, and
    the draw bar side walls include a support loop fixedly mounted to the draw bar side walls, and the support loop projects below the draw bar bottom wall, and the draw bar top wall includes spaced spring fingers mounted to the draw bar top wall defining a cylindrical cavity therebetween, with the cylindrical cavity symmetrically oriented about an axis, with the axis oriented parallel relative to the draw bar top wall, and spaced parallel flange plates orthogonally and fixedly mounted to the draw bar top wall between the spaced fingers and the cradle leg junction, and a pivot axle orthogonally mounted between the spaced flange plates, and an actuator lever, the actuator lever having an actuator lever first end pivotally mounted about the pivot axle, and an actuator lever handle secured to an actuator lever second end spaced from the first end, and the actuator lever handle is spaced from the pivot axle a predetermined length substantially equal to a further spacing oriented between the pivot axle and the cylindrical cavity, and the actuator lever including an actuator cable, wherein the actuator cable has a first end secured to the actuator lever, the actuator cable having a second end, the actuator cable second end including an actuator cable first leg and an actuator cable second leg secured thereto, the actuator cable first leg extends along the first cradle leg, the actuator cable second leg extends along the second cradle leg, with the first cradle leg including a first leg guide loop, with the actuator cable first leg directed therethrough, the second cradle leg having a second leg guide loop, with the actuator cable second leg directed therethrough, and the cradle leg including a first leg cylindrical boss, the second cradle leg having a second leg cylindrical boss, whereon the first leg cylindrical boss and the second leg cylindrical boss are coaxially aligned in a spaced relationship relative to one another, and a first leg plate pivotally mounted about the first cylindrical boss, and the second leg plate pivotally mounted about the second leg cylindrical boss, with the actuator cable first leg secured to the first leg plate and the actuator cable second leg secured to the second leg plate spaced from the actuator cable, with the first leg plate having a first wheel member pivotally mounted thereon, and the second leg plate having a second wheel member rotatably mounted thereon.

2. An apparatus as set forth in claim 1 including a first wheel axle and a second wheel axle, wherein the first wheel axle and the second wheel axle are coaxially aligned relative to one another and oriented parallel relative to the first leg cylindrical boss and the second leg cylindrical boss, and the first wheel is rotatably mounted about the first wheel axle and the second wheel is rotatably mounted about the second wheel axle, and the first leg plate includes a first spring connection biasing the first leg plate orthogonally relative to the first cradle leg, and the second leg plate including a second leg plate spring connection biasing the second leg plate orthogonally relative to the second cradle leg in an orthogonal relationship, wherein securing the actuator handle within the cylindrical cavity effects displacement of the first leg plate and the second leg plate to a second position pivoted relative to the first position.

3. An apparatus as set forth in claim 2 wherein the trailer container includes a container first side wall and a container second side wall having a side wall junction at an intersection of the trailer container first side wall and the trailer container second side wall, and the side wall junction is contiguously received within the cradle leg junction in contiguous communication therewith, and the trailer container first side wall including a first side wall flange, and the trailer container second side wall including a second container side wall flange, wherein the first side wall flange and the second side wall flange are orthogonally oriented relative to the trailer container first side wall and the trailer container second side wall respectively, and the first side wall flange includes a first side wall bifurcated end for receiving the first leg cylindrical boss therewithin, and the second side wall flange includes a second wall flange bifurcated end receiving the second leg cylindrical boss therewithin, and the trailer first side wall and the trailer container second side wall are spaced apart a predetermined spacing complementarily arranged for communication with the first cradle leg and the second cradle leg respectively, with the first side wall flange projecting over the first cradle leg and the second side wall flange projecting over the second cradle leg when the trailer container is received within the container trailer.

4. An apparatus as set forth in claim 3 wherein the trailer container includes a container lid and the trailer container includes a container rear wall, and the rear wall including hinge flanges mounted thereon, and the lid includes lid hinge flanges received within the rear wall hinge flanges, and the lid including a lid forward latch and the trailer container includes a container latch cooperative with the lid forward latch.

* * * * *